(12) United States Patent
Sakamoto et al.

(10) Patent No.: US 8,087,831 B2
(45) Date of Patent: Jan. 3, 2012

(54) ROTARY SUPPORT FOR WHEEL WITH ENCODER

(75) Inventors: Junshi Sakamoto, Fujisawa (JP); Hiroya Miyazaki, Fujisawa (JP)

(73) Assignee: NSK, Ltd., Tokyo (JP)

(*) Notice: Subject to any disclaimer, the term of this patent is extended or adjusted under 35 U.S.C. 154(b) by 929 days.

(21) Appl. No.: 10/476,009

(22) PCT Filed: Mar. 25, 2002

(86) PCT No.: PCT/JP02/02838
§ 371 (c)(1),
(2), (4) Date: May 19, 2004

(87) PCT Pub. No.: WO02/090133
PCT Pub. Date: Nov. 14, 2002

(65) Prior Publication Data
US 2004/0197039 A1  Oct. 7, 2004

(30) Foreign Application Priority Data

Apr. 25, 2001  (JP) .................................. 2001-126931

(51) Int. Cl.
*F16C 33/80* (2006.01)
*B60B 35/18* (2006.01)
(52) U.S. Cl. .......................... 384/544; 384/448; 384/480
(58) Field of Classification Search .................. 384/448, 384/446, 544, 589, 480; 324/207.25, 173
See application file for complete search history.

(56) References Cited

U.S. PATENT DOCUMENTS

| | | | |
|---|---|---|---|
| 3,465,425 A * | 9/1969 | Leidenfrost | 29/527.7 |
| 4,968,156 A | 11/1990 | Hajzler | 384/448 |
| 5,287,738 A | 2/1994 | Polinsky | 73/118.1 |
| 5,291,130 A | 3/1994 | Kendzior | 324/174 |
| 5,575,568 A * | 11/1996 | Rigaux et al. | 384/448 |
| 5,622,437 A * | 4/1997 | Alff | 384/448 |
| 5,762,425 A | 6/1998 | Ouchi | 384/448 |
| 5,852,361 A | 12/1998 | Ouchi et al. | 324/174 |
| 5,969,518 A | 10/1999 | Merklein et al. | 324/173 |

(Continued)

FOREIGN PATENT DOCUMENTS

JP  63-76504  * 5/1988

(Continued)

OTHER PUBLICATIONS

International Search Report dated Apr. 16, 2002.

*Primary Examiner* — William C Joyce
(74) *Attorney, Agent, or Firm* — Crowell & Moring LLP (57) ABSTRACT

It is prevented that magnetic foreign matter adheres the magnet encoder 3*a* to deteriorate the reliability of rotation speed detection with the sensor 4*a*. The encoder 3*a* is provided on the outside of the combined seal ring 19 with reference to the bearing interior space 24, and the sensor 4*a* faces the encoder 3*a*. The knuckle 21 is placed close to the housing 33 of the drive shaft member 28 of the constant velocity joint 27 to form a labyrinth seal 20. The width of the clearance of this labyrinth seal 20 is up to 40% of the pitch of adjacent S-poles and N-poles that are arranged on the detected surface of the encoder 3*a*. With this construction, larger foreign matter is prevented from attaching to the detected surface of the encoder 3*a* to solve the above subject.

2 Claims, 9 Drawing Sheets

U.S. PATENT DOCUMENTS

| | | | |
|---|---|---|---|
| 6,045,267 A | 4/2000 | Merklein et al. | 384/448 |
| 6,186,667 B1 | 2/2001 | Nakamura et al. | 384/448 |
| 6,328,476 B2 | 12/2001 | Nakamura et al. | 384/448 |

FOREIGN PATENT DOCUMENTS

| | | | |
|---|---|---|---|
| JP | 64-44258 | | 3/1989 |
| JP | 2-2527 | * | 1/1990 |
| JP | 2-11701 | | 1/1990 |
| JP | 05023136 U | | 3/1993 |
| JP | 07-089419 | | 4/1995 |
| JP | 7-31539 | | 6/1995 |
| JP | 08-136560 | | 5/1996 |
| JP | 10-300765 | | 11/1998 |
| JP | 11-257998 | | 9/1999 |
| JP | 2001-82979 | | 3/2001 |

* cited by examiner

ROTARY SUPPORT FOR WHEEL WITH ENCODER

FIELD OF THE INVENTION

This invention relates to a wheel rotation support apparatus with an encoder that supports the wheels of an automobile such that they rotate freely with respect to the suspension, and that detects the rotation speed of the wheels.

BACKGROUND OF THE INVENTION

A rolling-bearing unit is used to support the wheels of an automobile such that they rotate freely with respect to the suspension. Also, in order to control an anti-lock brake system (ABS) or traction-control system (TCS), it is necessary to detect the rotation speed of the wheels. In order to do this, it is common practice to support the wheels such that they rotate freely with respect to the suspension and to detect the rotation speed of the wheels by using a wheel-rotation support apparatus with encoder in which a rotational speed detector is assembled in the rolling-bearing unit.

Figure 9:
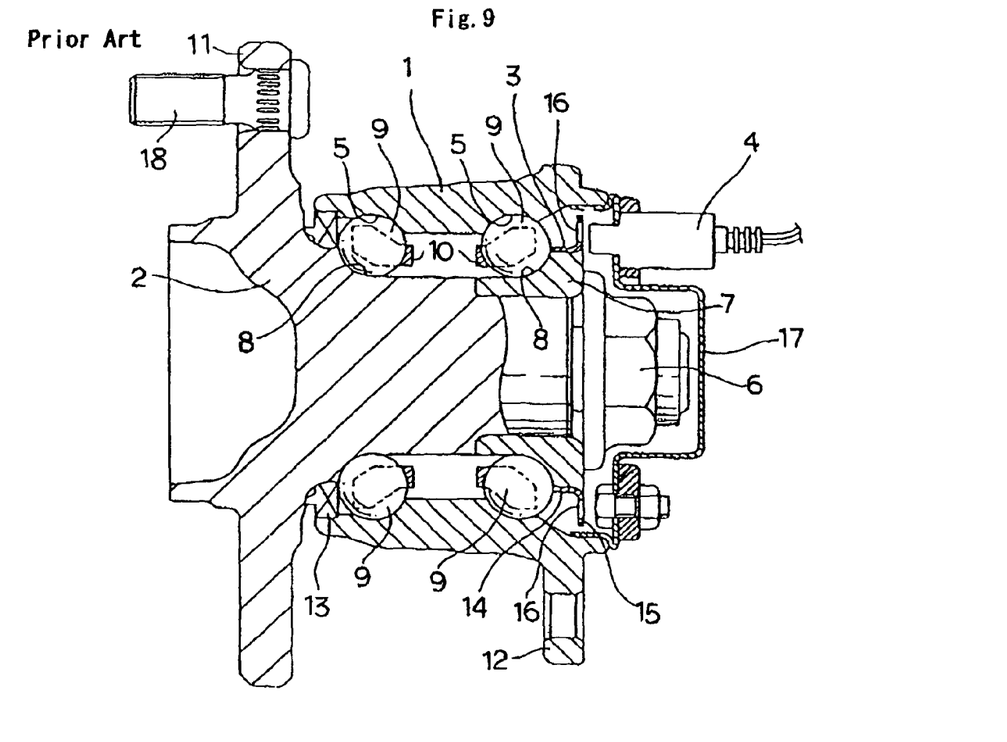
FIG. 9 is a cross sectional view taken along the line Y—O-Z in FIG. 10 to show an example of the prior art structure.
Figure 10:
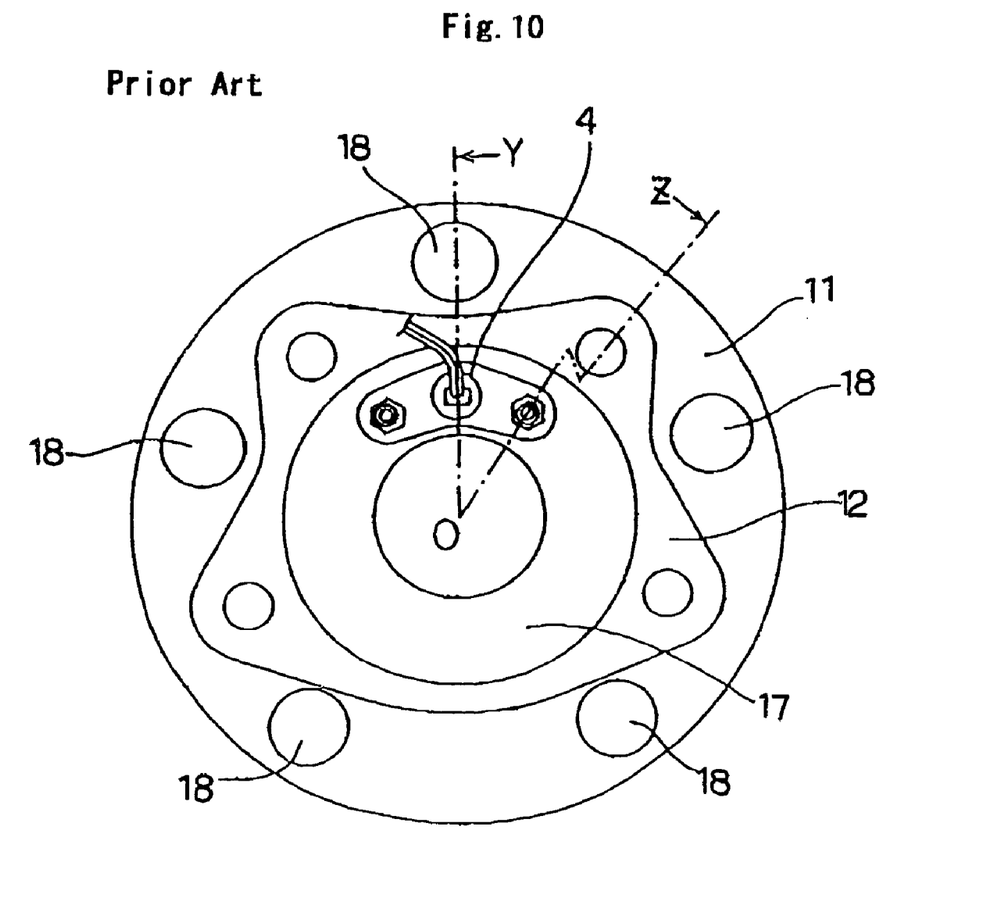
FIG. 10 is a view taken from the right side of FIG. 9.

FIG. 9 and FIG. 10 show one example of prior art construction of a wheel-rotation support apparatus with encoder that is used for the purpose mentioned above as disclosed in Japanese Patent Publication Jitsukai Hei 7-31539. This wheel-rotation support apparatus with encoder supports a hub 2, which is a rotating race that rotates during use, on the radial inside of an outer race 1, which is a stationary race that does not rotate even during use. A sensor 4 that is supported by the outer race 1 detects the rpm of an encoder 3 that is fastened to part of the hub 2. In order to do this, a plurality of rows of outer-raceways 5, which are stationary raceways, are formed around the inner peripheral surface of the outer race 1. Moreover, inner-raceways 8, which are rotating raceways, are formed around the outer peripheral surface of the hub 2 and around the outer peripheral surface of the inner race 7. The inner race 7 fits around the hub 2 and is fastened to the hub 2 by a nut 6, so as to form the rotating races together with the hub 2. In addition, there is a plurality of rolling elements 9 located between the each of the inner-raceways 8 and outer-raceways 5 such that they are rotatably held by retainers 10, and that they rotatably support the hub 2 and inner race 7 on the inside of the outer race 1.

Also, a flange 11 for installing the wheel and a rotating member for braking such as a disk rotor, or drum is formed on the outside end in the axial direction of the hub 2 (the outside with respect to the axial direction is the side toward the outside in the width direction when the apparatus is assembled in the automobile, or the left side in all of the attached drawings except for FIGS. 2 to 4 and FIG. 10) in the section that protrudes outward in the axial direction from the outside end of the outer race 1. Moreover, an installation section 12 for installing the outer race 1 to the suspension is formed on the inside end of the outer race 1 (the inside with respect to the axial direction is the side toward the center in the width direction when the apparatus is assembled in the automobile, and is the right side in all of the drawings except for FIGS. 2 to 4 and FIG. 10). Also, the clearance between the opening on the outside end of the outer race 1 and the outer peripheral surface around the middle section of the hub 2 is sealed by a seal ring 13. In the case of a rolling-bearing unit for a heavy vehicle, tapered rollers may be used instead of the balls shown in the figures as the plurality of rolling elements 9.

In order to assemble a rotation speed detector in this kind of rolling-bearing unit, an encoder 3 is fastened around the outer peripheral surface on the inside end of the inner race 7 in the section that is separated from the inner-ring raceway 8. This encoder 3 is formed from a magnetic metal plate such as carbon steel plate by plastic working into a generally circular shape having an L-shaped cross section, and is such that it comprises a cylindrical section 14 and circular-ring section 15, and of these, the cylindrical section 14 is fastened around the inside end of the inner race 7 by interference-fitting. Also, by forming a plurality of through holes 16 in the circular-ring section 15 that have a long slit shape in the radial direction of the circular-ring section 15 and such that they are uniformly spaced in the circumferential direction; the magnetic characteristics of the circular-ring section 15 alternately change at equal intervals in the circumferential direction.

Furthermore, a cover 17 is attached to the opening on the inside end of the outer race 1 such that it faces the inner surface of the circular-ring section 15 of the encoder 3, and this cover 17 covers the opening on the inside end of the outer race 1. The sensor 4 is fastened to this cover with a specified location relationship. When this sensor 4 is fastened to the cover 17, the detection section of the sensor 4 faces through a small clearance the inside surface of the circular-ring section 15 of the encoder 3.

When using this wheel-rotation support apparatus with encoder, the installation section 12 that is formed around the outer peripheral surface of the outer race 1 is fastened to the suspension by a bolt (not shown in the figure), and the wheel is fastened to the flange 11 that is formed around the outer peripheral surface of the hub 2 by the studs 18 that are formed in the flange 11 such that the wheel is supported so that it can rotate freely with respect to the suspension, When the wheel rotates in this state, the through holes 16 that are formed in the circular-ring section 15 and the column sections that are located between pairs of adjacent through holes 16 in the circumferential direction alternately pass nearby the detection section of the sensor 4. As a result, the density of the magnetic flux flowing though the sensor 4 changes, and thus the output of the sensor 4 changes. The frequency at which the output of the sensor 4 changes in this way is proportional to the rpm of the wheel. Therefore, by sending the output from the sensor 4 to a controller (not shown in the figure), it is possible to sufficiently perform ABS or TCS control.

With the prior art construction shown in FIG. 9 and FIG. 10, an encoder made of magnetic metal plate was used as the encoder 3, and the permanent magnet for generating the magnetic flux was located on the side of the sensor 4. On the other hand, various kinds of rotation speed detectors have been proposed in which an encoder that rotates with the rotating race is made of permanent magnet. In the case of an encoder made of a permanent magnet, S-poles and N-poles are arranged around the detected surface that faces the detection section of the sensor such that they alternate at uniform intervals. When using this kind of encoder made of a permanent magnet, the construction of the sensor becomes simplified, and the rpm can be detected with good accuracy even at low running speeds, much research for putting it into practice has been performed in this area in recent years.

In the case of an encoder made of a permanent magnet, there is a possibility that the encoder itself will absorb magnetic powder, so the installation conditions were limited. For example, in the case of the prior art construction shown in FIG. 9, the encoder 3 was located in a section that was completely blocked from the external space by the seal ring 13 and cover 17, so even in the case of using an encoder made of a permanent magnet in the place of this encoder 3 there is no particular problem. In other words, in the case of the construction shown in FIG. 9, foreign matter that is floating in the external space cannot enter into the area where the encoder 3 is located, so even when an encoder made of a permanent magnet is used in the place of this encoder 3, magnetic powder is not absorbed by the permanent magnet encoder.

On the other hand, in the case of an encoder that is assembled in the rotation support apparatus for a non-independent suspension such as for a driven wheel or truck, this encoder may have to be located further in the external space than the seal that partitions off the external space and the space inside the bearing where the rolling elements are located. In this case, magnetic power will adhere to the encoder unless some kind of countermeasures are taken, and there is a possibility that reliability of the rpm detection by the sensor will be lost. By simply separating the section where the encoder is located from the external space by a seal member with very a very good seal in order to prevent magnetic powder from adhering to the encoder in this way, the torque required to turn the wheel becomes larger, and causes operating performance of the automobile to become worse.

DISCLOSURE OF THE INVENTION

The wheel-rotation support apparatus with encoder of this invention was invented taking into consideration the problems mentioned above.

The wheel-rotation support apparatus with encoder of this invention comprises a stationary race, rotating race, flange, a plurality of rolling elements, seal member, permanent magnet encoder, and labyrinth seal.

Of these, the stationary race does not rotate when supported by the suspension.

Also, the rotating race is located such that it is concentric with the stationary race, and it rotates together with the wheel.

Moreover, the flange is for supporting the wheel and rotating brake member, and it is formed around the outer peripheral surface of the rotating race.

The rolling elements are located between the stationary-raceways and rotating-raceways that are formed around the opposing peripheral surfaces of the stationary race and rotating race such that they can roll freely.

The seal member separates the external space from the space inside the bearing where the rolling elements are located.

Moreover, the permanent magnet encoder is located on the side closer to the external space of the seal member and is supported by a section that rotates together with the rotating race, and the S-poles and N-poles are arranged on the detected surface such that they alternate in the circumferential direction.

Furthermore, the labyrinth seal is located between the encoder and the external space, and the width of the clearance of this labyrinth seal is 40% or less that of the pitch of adjacent S-poles and N-poles that are arranged on the detected surface of the encoder.

In the case of the wheel-rotation support apparatus with encoder of this invention constructed as described above, foreign matter (magnetic powder) having a diameter greater than 40% of the pitch of adjacent S-poles and N-poles cannot get into the area where the encoder is located. Therefore, the possibility of magnetic powder having a large diameter adhering to the detected surface of the encoder and greatly decreasing the density of the magnetic flux emanating from the encoder becomes small, so that the reliability in detecting the wheel-rotation speed is improved. In addition, the non-contact labyrinth seal is used, so the torque required for turning the wheel does not increase and the operating performance of the automobiles does not become worse.

BEST EMBODIMENTS TO WORK THE PRESENT INVENTION

Figure 1:
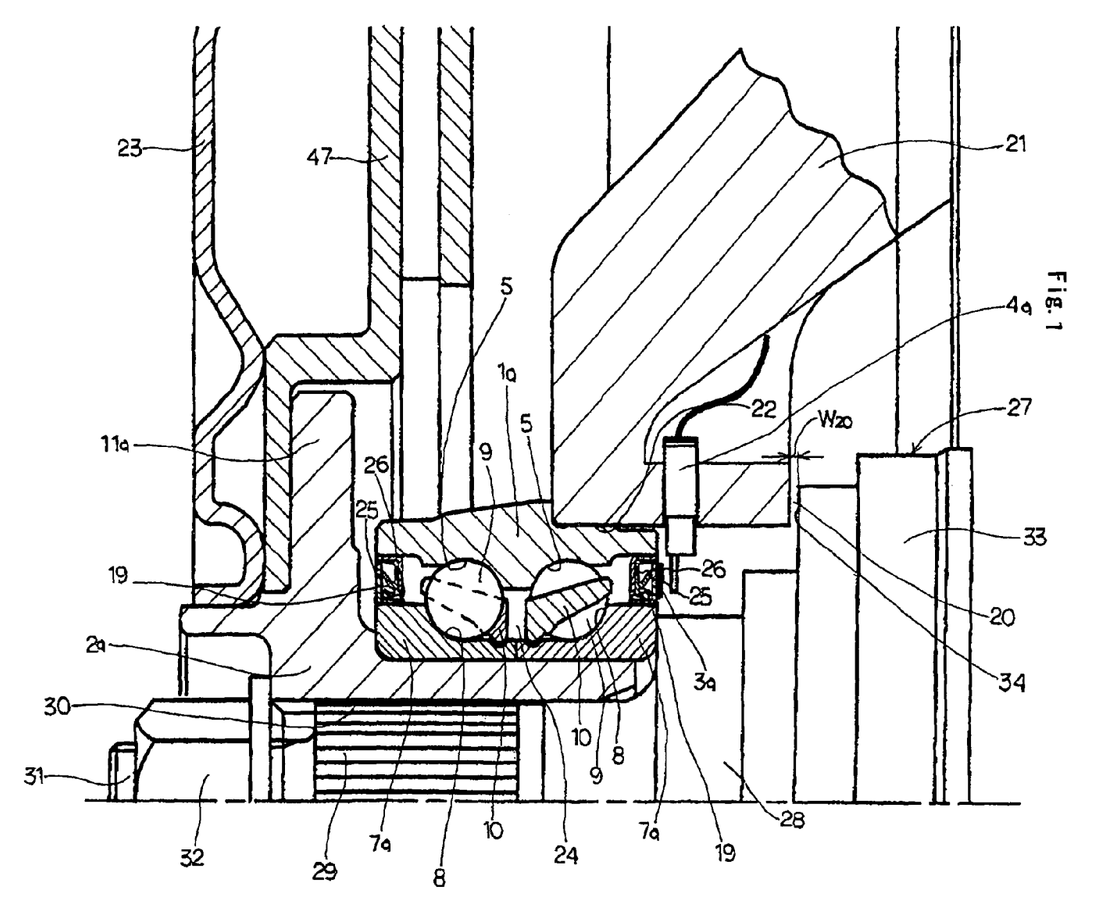
FIG. 1 is a partial cross-sectional view to show an example of the embodiment of the present invention.

FIG. 1 shows a first example of the embodiment of the invention. This example is of the case where the invention is applied to the section that supports the driven wheels on an independent suspension such as the front wheels of a FF automobile. The wheel-rotation support apparatus with encoder of this embodiment comprises: an outer race 1a, which is the stationary race; hub 2a and inner races 7a, which form the rotating race; a flange 11a; a plurality of rolling elements 9; combined seal rings 19, which make up the seal member; a permanent magnet encoder 3a; and a labyrinth seal 20.

Of these, the outer race 1a is fastened to and supported by this knuckle 21 such that its axial inside end is fitted into the support hole 22 that is formed in the knuckle 21 of the suspension, and such that it does not rotate when the automobile is running. Two rows of outer-ring raceways 5, which are the stationary raceways, are formed around the inner peripheral surface of the outer race 1a. Also, the hub 2a and inner races 7a are arranged such that they are concentric with the outer race 1a, and they rotate together with the wheel. Of these, a flange 11a is formed around the outer peripheral surface on the outside end in the axial direction of the hub 2a, and the inner races 7a fit around the hub 2a from the middle to the inside end. Inner-ring raceways 8, which are rotating raceways, are formed around the outer peripheral surface of these inner races 7a. Also, the hub 2a and inner races 7a are supported on the radially inside of the outer race 1a such that they rotate freely by placing a plurality of rolling elements 9 between each of the inner-ring raceways 8 and outer-ring raceways 5.

Also, the wheel 23 and disk 47 are fastened to the flange 11a by screwing and tightening nuts (not shown in the figure) onto the studs (also not shown in the figure) that are fastened to the base end of the flange 11a. Of these, the wheel 23 together with the tire (not shown in the figure) makes up the wheel of the automobile, and the disk 47, which is the rotation-braking member, makes up the disk brake, which is the braking apparatus.

The combined seal rings 19 are located between the inner peripheral surface on both ends of the outer race 1a, and the outer peripheral surface on the ends of the inner races 7a, and they separate the external space from the space 24 inside the bearing where the rolling elements 9 are located. These combined seal rings 19 each comprise a slinger 25 and a seal ring 26, and of these, the slinger 25 fits against the outer peripheral surface on one end of the inner races 7a, and the core metal of the seal ring 26 tightly fits such that it is fastened to the inner peripheral surface on the respective ends of the outer race 1a. Also, the seal lip that is formed around the seal ring 26 comes in rubbing contact all the way around the circumference of the slinger 25 such that it seals the space 24 inside the bearing from the outside.

The permanent magnet encoder 3a is attached all the way around the inside surface in the axial direction of the slinger 25 of the combined seal ring 19 on the inside in the axial direction. The encoder 3a is a rubber magnet or plastic magnet in which a ferromagnetic material such as ferrite or rare-earth element is mixed within the rubber or synthetic resin, and it is formed entirely in a circular ring shape with magnetic orientation in the axial direction. The direction of magnetic orientation alternately changes at uniform intervals around the circumferential direction. In order to do this, the S-poles and N-poles on the inside surface, detected surface, in the axial direction of the encoder 3a are arranged such that they alternate at uniform intervals. The detection section of an active sensor 4a, which is supported by the knuckle 21 such that it protrudes inward in the radial direction from the inner peripheral surface of the support hole 22, comes close to and faces the detected surface of this kind of encoder 3a. As the encoder 3a rotates together with the wheel when the automobile is running, the output of the sensor 4 changes at a frequency that is proportional to the rpm.

Furthermore, the labyrinth seal 20 is formed by having the inside surface in the axial direction of the knuckle 21 come closer to part of the constant-velocity joint 27 that is joined and fastened to the hub 2a. In other words, the drive-shaft member 28 of the constant-velocity joint 27 has a spline section 29 formed on the outer half in the axial direction, and by inserting the spline section 29 from the inside in the axial direction into a spline hole 30, which is formed in the center section of the hub 2a, the drive-shaft member 28 is combined with the hub 2a, so that the rotation force is transmitted between them. Also, the drive-shaft member 28 is fastened to the hub 2a by screwing and tightening a nut 32 onto the male screw section 31 formed on the tip end (outside end in the axial direction) of the spline section 29. In this state, the axially outside end surface of the housing unit 33, which functions as the outer ring of the constant-velocity joint and which is formed on the inner half in the axial direction of the drive-shaft member 28, comes in contact with the axially inside end surface of the inner race 7a to hold the inner race 7a in place against the hub 2a.

The outer peripheral surface of the housing 33 is formed in a stepped shape such that the outer diameter becomes larger towards the inside in the axial direction. Also, the step surface 34 that exists in the middle in the axial direction is close to and faces the inside surface in the axial direction of the knuckle 21 to form the labyrinth seal 20. The width $W_{20}$ of the clearance of the labyrinth seal 20 is 40% or less than the pitch of adjacent S-poles and N-poles that are arranged on the detected surface (inside surface in the axial direction) of the encoder 3a.

In the case of the wheel-rotation support apparatus with encoder of this example constructed as described above, foreign matter (magnetic powder) having an outer diameter that is greater than 40% the pitch of adjacent S-poles and N-poles does not get into the area where the encoder 3a is located, or in other words, the radially inner side of the support hole 22 of the knuckle 21 between the combined seal ring 19 on the inside in the axial direction and the labyrinth seal 20. Therefore, the possibility of magnetic powder having a large diameter adhering to the detected surface of the encoder 3a and greatly decreasing the density of the magnetic flux from the encoder 3a becomes small, and thus it is possible to improve the reliability of the detected wheel rpm. Also, since a non-contact type labyrinth seal 20 is used, the torque required for turning the wheel does not increase, and the operating performance of the automobile does not become worse.

Next, the reason why it is possible to improve the reliability of the detected wheel rpm by preventing magnetic powder having an outer diameter that is greater than 40% of the pitch of adjacent S-poles and N-poles from adhering to the detected surface of the encoder 3a will be explained. The value 40% was found by the inventor through experimentation. First, the experimental test conditions will be explained. The permanent magnet encoder 3a had a detected section (section that faces the detection surface of the sensor 4a) having a diameter of 61 mm, and the number of S-poles and N-poles was 48 each, or a total of 96 poles. In addition, the pitch of adjacent S-poles and N-poles was 2.0 (61 $\pi$/96) mm.

As shown in FIG. 2(A), a strip-shaped piece of iron 35 was allowed to adhere to the detected surface of the encoder 3a by the magnetic force such that it was oriented in the radial direction, and the effect that the width $W_{35}$ and adhering position of the iron piece 35 had on the detection signal from the active-type sensor 4a was measured based on the density of the magnetic flux from the detected surface and changes in density of that magnetic flux. In the case of using a labyrinth seal 20 as in this invention, the housing 33 rotates during operation, and the strip-shaped piece of iron 35 as shown in FIG. 2(A) rarely passes through the labyrinth seal 20 even when the width $W_{35}$ of the iron piece 35 is smaller than the width $W_{20}$ of the labyrinth seal 20. The foreign matter that does pass through this labyrinth seal 20 is mostly particle-shaped. The reason the strip-shaped iron piece 35 described above was used in the experimental test was in order to make the test conditions more severe in the direction that would cause the area of the flowing magnetic flux to increase. In any event, taking into consideration the case in which the strip-shaped iron piece 35 as shown in FIG. 2(A) adhered to in the circumferential direction of the encoder 3a (direction orthogonal to that shown in the figure) is unrealistic.

Figure 2:
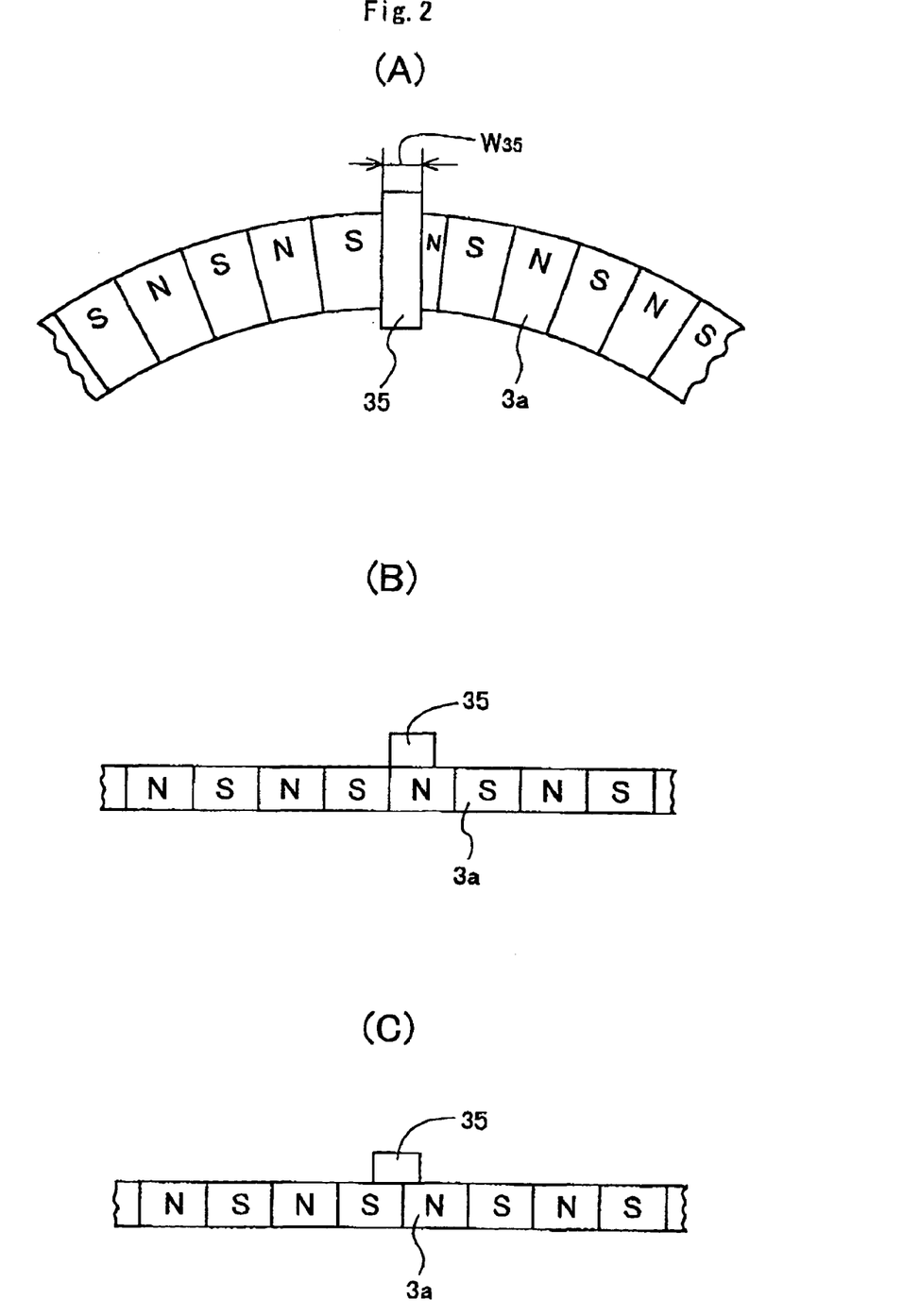
FIGS. 2(A) to 2(C) are a diagramatical view to show a detected surface of the permanent magnet encoder to which magnetic foreign matter is attached.

Under the conditions described above, the density of the magnetic flux of the detected surface and the detection signal from the sensor 4a were measured for both the case when the iron piece 35 was allowed to adhere to only one of the poles (N-pole in the figure) as shown in FIG. 2 (B), and when the iron piece 35 was allowed to adhere across both a S-pole and N-pole as shown in FIG. 2(C). Also, with regards to the width $W_{35}$ of the iron piece 35, in the case of allowing the iron piece 35 to adhere to only one of the poles as shown in FIG. 2(B), measurements were made by changing the width $W_{35}$ in six stages from 0.5 mm to 1.0 mm in 0.1 mm increments; and in the case of allowing the iron piece 35 to adhere across both the S-pole and N-pole as shown in FIG. 2(C), measurements were also made for a width $W_{35}$ of 1.5 mm and 2.0 mm in addition to the six stages mentioned above.

Figure 3:
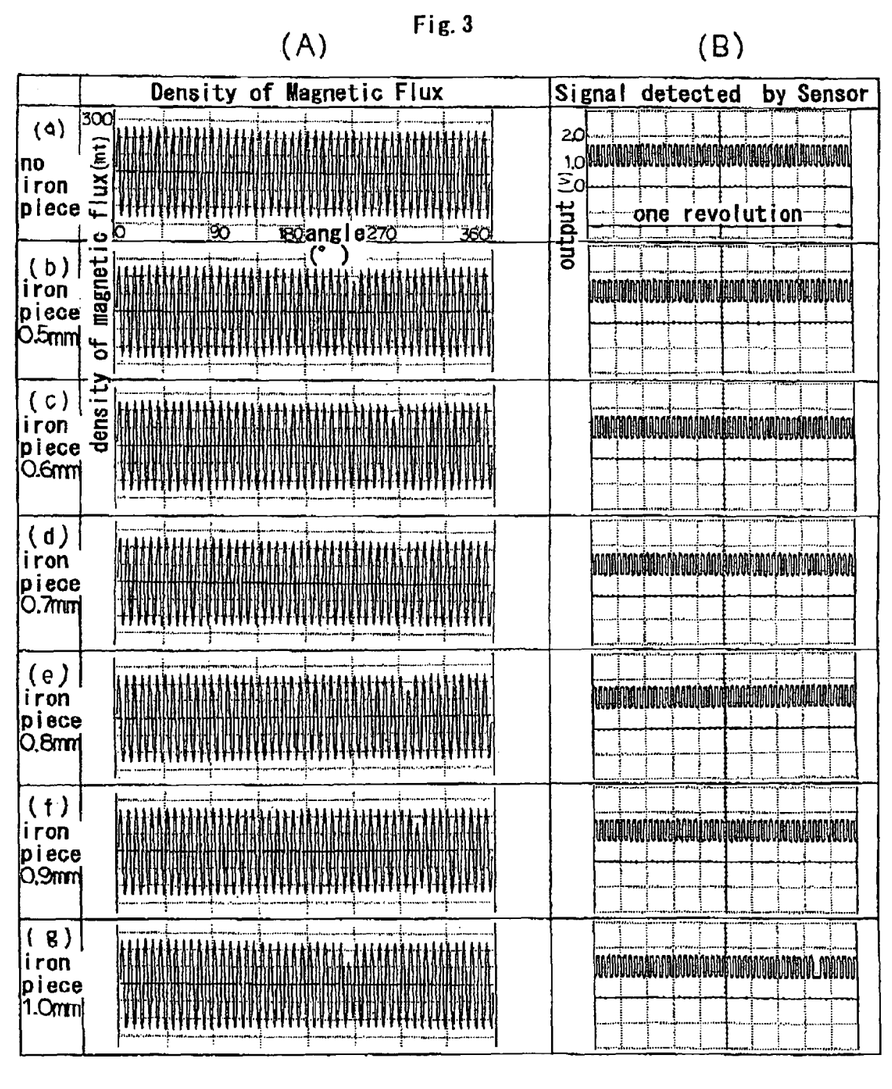
FIG. 3(A) is a graph to show to show the density of magnetic flux emanating from the detected surface of the encoder to which the foreign matter is attached as shown in FIG. 2(B).
FIG. 3(B) is a graph to show the sensor output corresponding to the change of the density of the magnetic flux in FIG. 3(A).
Figure 4:
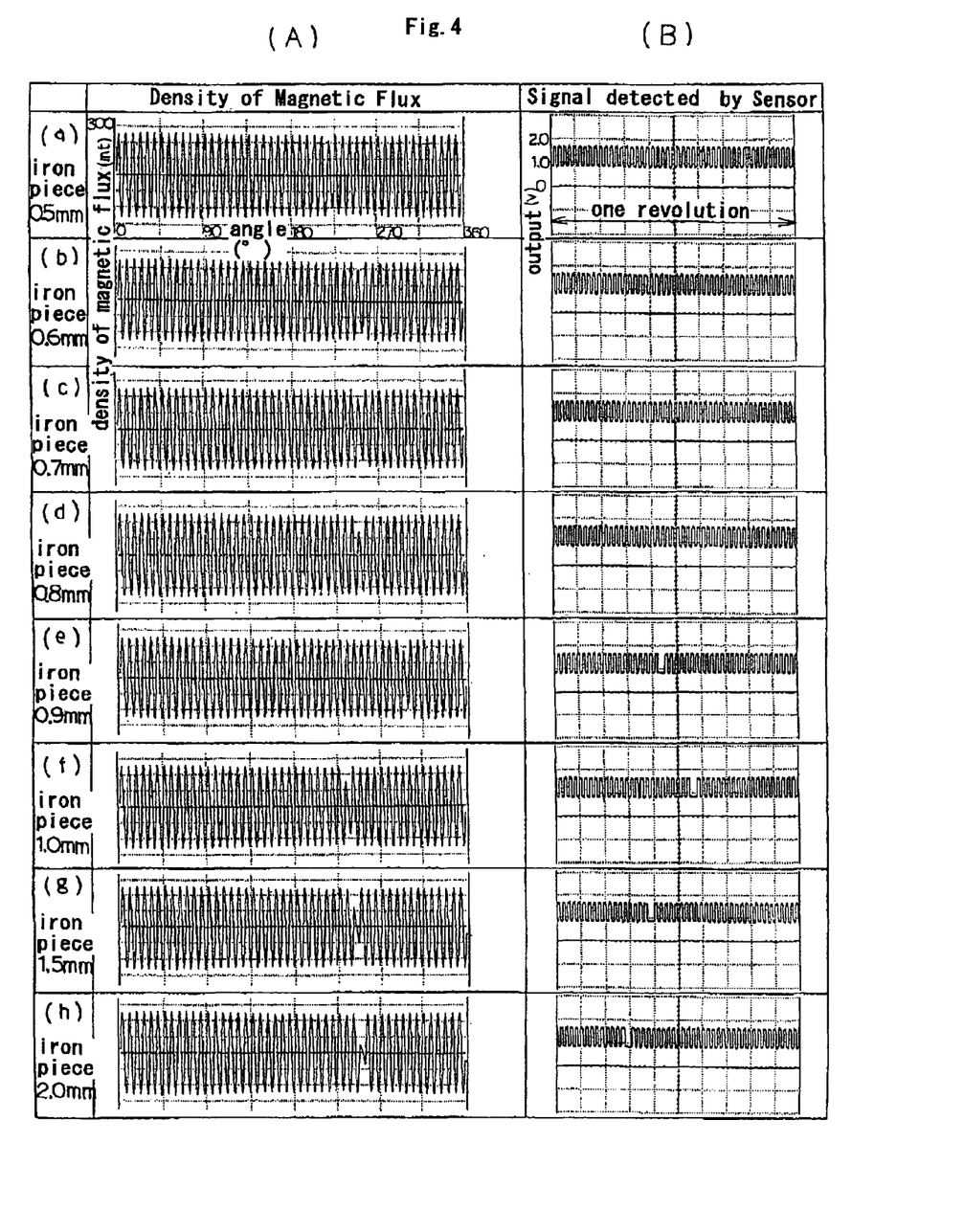
FIG. 4(A) is a graph to show the density of magnetic flux emanating from the detected surface of the encoder to which the foreign matter is attached as shown in FIG. 2(C).
FIG. 4(B) is a graph to show the sensor output corresponding to the change of the density of the magnetic flux in FIG. 4(A).

The results of the experimental test performed under these conditions are shown in FIGS. 3(A) and 3(B) and FIGS. 4(A) and 4(B). FIG. 3(A) and FIG. 4(A) show the magnetic flux density, and FIG. 3(B) and FIG. 4(B) show the detection signal from the sensor. Also, FIGS. 3(A) and 3(B) show the measurement results for the case shown in FIG. 2 (13) in which the iron piece 35 was allowed to adhere to only one of the poles; and FIGS. 4(A) and 4(B) show the measurement results for the cases shown in FIG. 2(C) in which the iron piece 35 was allowed to adhere across the S-pole and N-pole. As can clearly be seen from FIG. 3, in the case where the iron piece 35 was allowed to adhere to only one of the poles, the detection signal from the sensor 4a was not missing when the width $W_{35}$ of this iron piece 35 was 0.9 mm (45% the pitch) or less, and the rpm detection could be performed accurately. On the other hand, as can be seen from FIG. 4, in the case where the iron piece 35 was allowed to adhere across the S-pole and N-pole, the detection signal from the sensor 4a was not missing and accurate rpm detection was possible only as long as the width $W_{35}$ of the iron piece 35 was kept to 0.8 mm (40% the pitch) or less.

Since it is impossible to regulate how magnetic foreign matter will adhere to the detected surface of the encoder 3a, it is necessary to make it possible to perform rpm detection using the sensor 4a even when the foreign matter adheres as shown in FIG. 2(C). In the case of wheel-rotation support apparatus with encoder of this invention, the width $W_{20}$ of the labyrinth seal 20 that exists between the detected surface of the encoder 3a and the external space where the foreign matter exists is 40% the pitch of adjacent S-poles and N-poles (2.0 mm×0.4=0.8 mm) or less, so even when the foreign matter adheres as shown in FIG. 2(C), the rpm detection by the sensor 4a can continue to be performed with good reliability with no missing detection signal.

Figure 5:
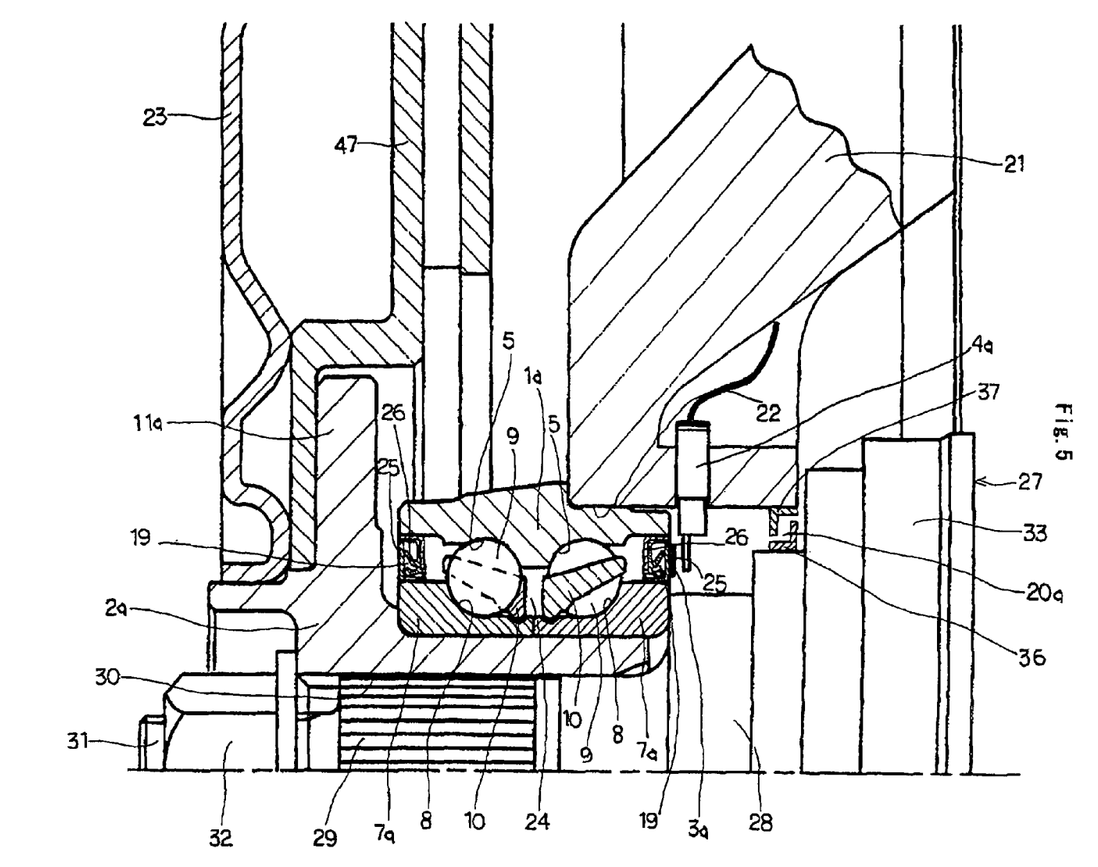
FIG. 5 is a partial cross sectional view to show a second example of the embodiment of the present invention.

Next, FIG. 5 shows a second example of the embodiment of the invention. In this example, the labyrinth seal 20a is located between the outer peripheral surface in the middle section of the housing 33 of the drive-shaft member 28 of the constant-velocity joint 27 and the inner peripheral surface of the support hole 22 of the knuckle 21. Therefore, in this example, a rotating ring 36 that has a generally ring shape and an L-shaped cross section, is tightly fitted and fastened around the outer peripheral surface in the middle section of the housing 33, and a stationary ring 37 that has a generally ring shape and an L-shaped cross section, is tightly fitted and fastened around the inner peripheral surface on the axially inside end of the support hole 22. This stationary ring 37 and rotating ring 36 are made to face each other closely to form the labyrinth seal 20a. The other construction and functions, including that the width of the gap of the labyrinth seal 20a is kept to 40% or less of the pitch of adjacent S-poles and N-poles, are substantially the same as described for the first example, so the same reference numbers are used for identical parts and any redundant explanation is omitted.

Figure 6:
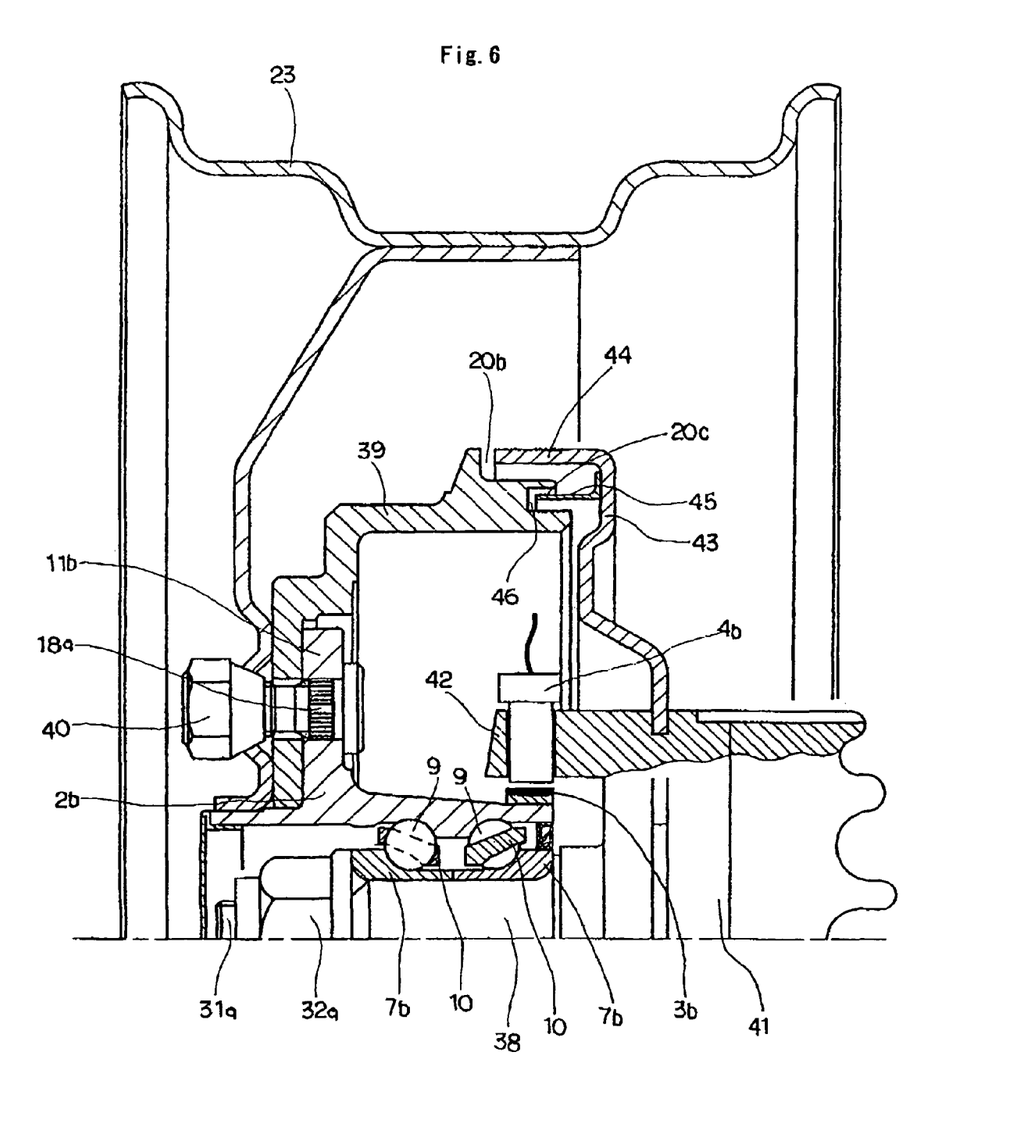
FIG. 6 is a partial cross sectional view to show a third example of the embodiment of the present invention

Next, FIG. 6 shows a third example of the embodiment of the invention. This example shows the case in which the invention is applied to construction for supporting non-driven wheels that use a drum brake as the braking apparatus and which are supported by an independent suspension such as in the case of the rear wheels of a FF automobile. In accordance with this change in construction, in the case of this example, a pair of inner races 7b, which make up the stationary race, are fitted around the non-rotating wheel shaft 38 that is supported by the suspension, and these inner races 7b are fastened to the wheel shaft 38 by screwing and tightening a nut 32a onto the male screw 31a that is formed on the axially outside end of this wheel shaft 38.

Also, the rotating ring or hub 2b is supported by a plurality of rolling elements 9 such that it rotates freely around these inner races 7b. Moreover, a drum 39, which is the rotation-braking member, and a wheel 23 of the automobile wheel, are fastened with stud 18a and nut 40, to a flange 11b that is formed around the outer peripheral surface of the hub 2b in the section near the axially outside end.

A permanent magnet encoder 3b is fitted around and fastened to the outer peripheral surface on the axially inside end of the hub 2b. This encoder 3b is comprised of a core metal and permanent magnets and formed generally into a cylindrical shape by attaching the permanent magnets all the way around the outer peripheral surface of the core metal, and its magnetic orientation is in the radial direction. Also, by alternately changing the direction of magnetic orientation at uniform intervals, the S-poles and N-poles are arranged around the outer peripheral surface or detected surface such that they alternate at uniform intervals. Moreover, the detection section of a sensor 4b, that is supported by an installation section 42 formed on part of the boss section 41 on the inside end of the wheel shaft 38, faces the outer peripheral surface of the encoder 3b through a small clearance.

Furthermore, the boss section 41 supports the inner peripheral edge of a backing plate 43 for supporting the wheel cylinder and brake shoe of the drum brake. Also, a labyrinth seal 20b is generally circumferentially formed by having a cylindrical wall section 44, which is formed by bending the outer peripheral edge of this backing plate 43 outward in the axial direction, to come close to and face the drum 39. In the example shown in the figure, the tip edge of a ring-shaped plate 45 that is attached to the outside surface in the axial direction of the backing plate 43 enters into a concave groove 46 that is formed in the end of the drum 39 to also form a labyrinth seal 20c. In the case of this example, the width of the gap of one or both of these labyrinth seals 20c, 20b is 40% or less than the pitch of adjacent S-poles and N-poles provided on the outer peripheral surface of the encoder 3b. Therefore, in this example as well, it is possible to prevent the density of the magnetic flux coming from the outer peripheral surface of the encoder 3b from decreasing, and thus it is possible to secure reliability of the rpm detection by the sensor 4b.

Figure 7:
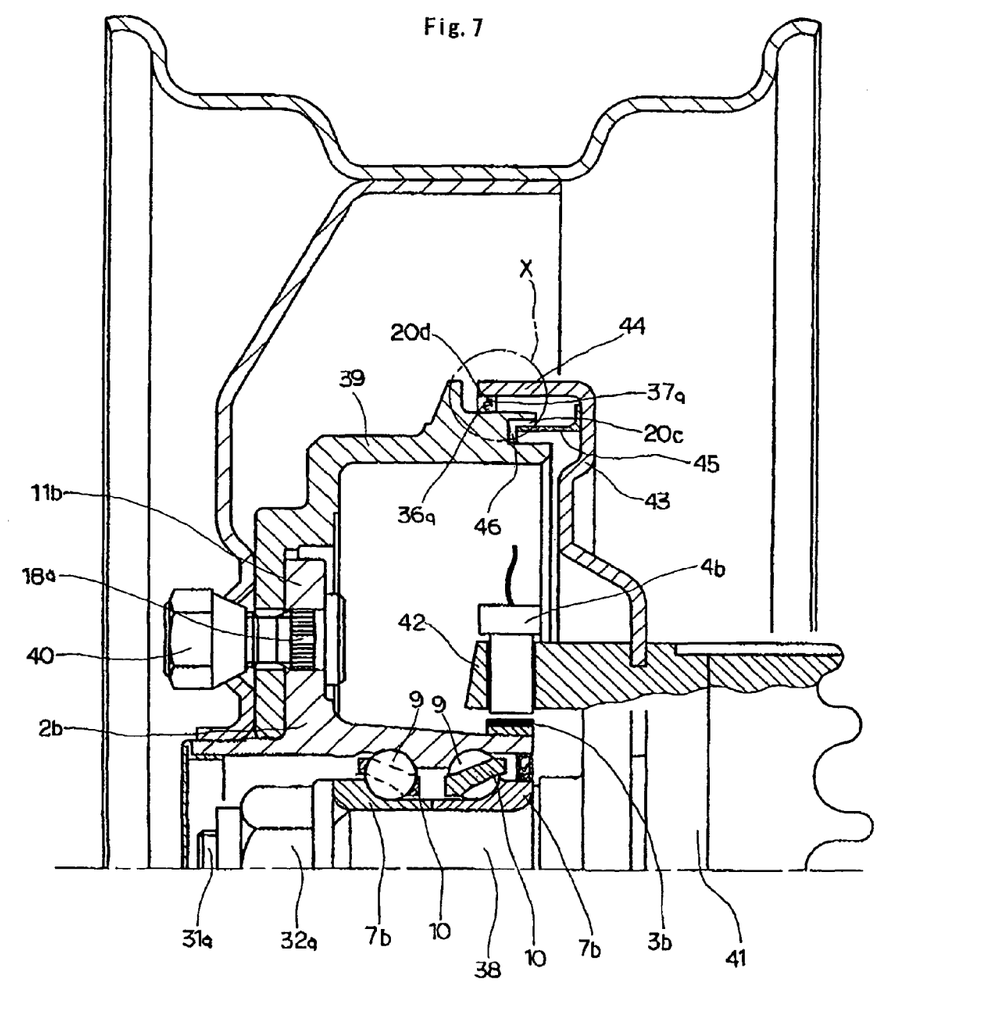
FIG. 7 is a partial cross sectional view to show a fourth example of the embodiment of the present invention.
Figure 8:
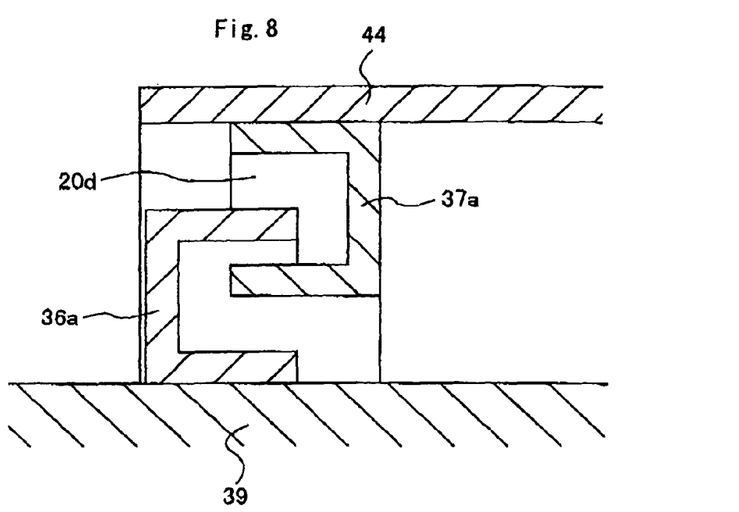
FIG. 8 is an enlarged view of Portion X in FIG. 7.

Next, FIG. 7 and FIG. 8 show a fourth example of the embodiment of the invention. In the case of this example, a stationary ring 37a, which is formed generally into a ring shape having a channel-shaped cross section, is fastened through interference fitting into the inner peripheral surface on the tip end (outside end in the axial direction) of the cylindrical wall section 44 that is formed on the outer peripheral edge of the backing plate 43, and a rotating ring 36a, which is also formed generally into a ring shape having a channel-shaped cross section, is fastened through interference fitting onto the outer peripheral surface in the middle section of the drum 39. The rotating ring 36a and stationary ring 37a form a labyrinth seal 20d by having them overlap in the radial direction and closely face each other. The other construction and functions, including that the width of the gap of the labyrinth seal is kept to 40% or less of the pitch of adjacent S-poles and N-poles or less, are substantially the same as described for the third example, so the same reference numbers are used for identical parts and any redundant explanation is omitted.

INDUSTRIAL APPLICABILITY

The wheel-rotation support apparatus with encoder of this invention is constructed and function as described above, so it is possible to prevent partial deterioration of the magnetic flux density of the permanent magnet encoder even when construction is used where the permanent magnet encoder is located further toward the external space than the seal member that separates the external space from the space inside the bearing, and thus it is possible to sufficiently secure the reliability of the detected rpm.

What is claimed is:

1. A wheel-rotation support apparatus with encoder comprising:
    a stationary race which does not rotate when supported by the suspension,
    a rotating race which is located concentric with the stationary race to rotate together with a wheel,
    a flange which is formed around the outer peripheral surface of the rotating race to support the wheel and a rotating brake member,
    a plurality of rolling elements which are located between the stationary-raceways and rotating-raceways that are formed around the opposing peripheral surfaces of the stationary race and rotating race such that they can roll freely,
    a seal member which is provided to separate the external space from the space inside the bearing where the rolling elements are located,
    a permanent magnet encoder which is located on the side closer to the external space of the seal member and supported by a section that rotates together with the rotating race, S-poles and N-poles of the permanent magnet encoder being arranged on a detected surface to alternate in a circumferential direction, and
    a labyrinth seal which is located between the encoder and the external space,
    wherein a width of the clearance of the labyrinth seal is 40% of the pitch of adjacent S-poles and N-poles that are arranged on the detected surface of the encoder, and the labyrinth seal is formed by a portion of a constant velocity joint connected and fixed to the rotating race and a portion of the knuckle of the suspension wherein the portions come closer to each other, such that magnetic powder having particles with a diameter greater than 40% of the pitch of adjacent S-poles and N-poles cannot attach to the detected surface of the encoder so as to improve the reliability in detecting a wheel rotation speed.

2. A wheel-rotation support apparatus with encoder comprising:
    a stationary race which does not rotate when supported by the suspension,
    a rotating race which is located concentric with the stationary race to rotate together with a wheel,
    a flange which is formed around the outer peripheral surface of the rotating race to support the wheel and a rotating brake member,
    a plurality of rolling elements which are located between the stationary-raceways and rotating-raceways that are formed around the opposing peripheral surfaces of the stationary race and rotating race such that they can roll freely,
    a seal member which is provided to separate the external space from the space inside the bearing where the rolling elements are located,
    a permanent magnet encoder which is located on the side closer to the external space of the seal member and supported by a section that rotates together with the rotating race, S-poles and N-poles of the permanent magnet encoder being arranged on a detected surface to alternate in a circumferential direction, and
    a labyrinth seal which is located between the encoder and the external space,
    wherein a width of the clearance of the labyrinth seal is 40% of the pitch of adjacent S-poles and N-poles that are arranged on the detected surface of the encoder, and the labyrinth seal is formed in the axial direction and wherein the labyrinth seal comprises a rotating ring fixed to part of a constant velocity joint, which is connected and fixed to the rotating race, and a stationary ring fixed to part of a knuckle of the suspension, wherein the stationary ring and rotating ring are placed close to each other, such that magnetic powder having particles with a diameter greater than 40% of the pitch of adjacent S-poles and N-poles cannot attach to the detected surface of the encoder so as to improve the reliability in detecting a wheel rotation speed.

* * * * *